W. A. GUNN & L. W. LINK.
TROLLEY WHEEL HOLDER AND GUIDE.
APPLICATION FILED SEPT. 10, 1908.
958,744.
Patented May 24, 1910.
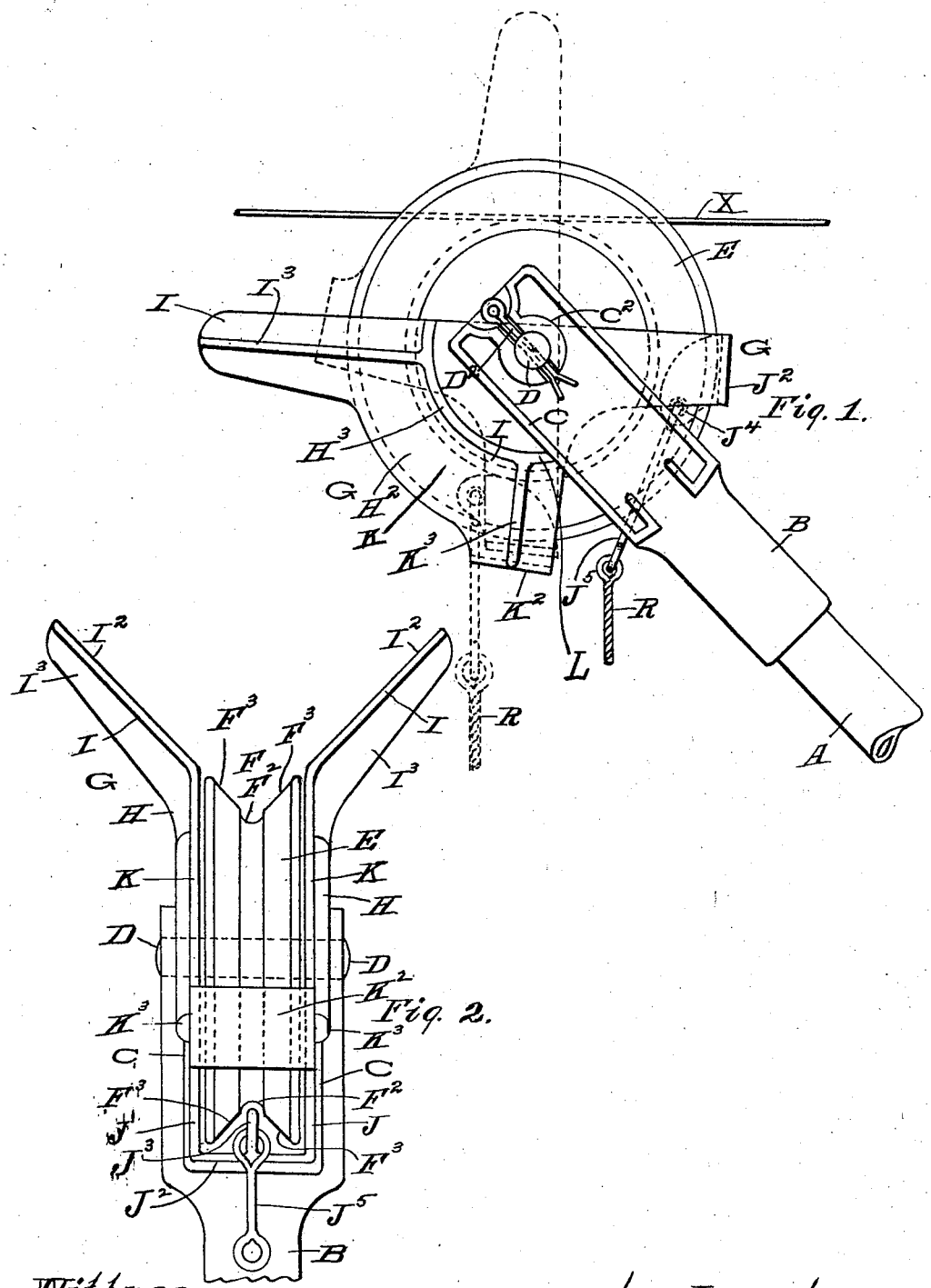

UNITED STATES PATENT OFFICE.

WILLIAM A. GUNN AND LEWIS W. LINK, OF CINCINNATI, OHIO.

TROLLEY-WHEEL HOLDER AND GUIDE.

958,744.  Specification of Letters Patent.  Patented May 24, 1910.

Application filed September 10, 1908. Serial No. 452,411.

*To all whom it may concern:*

Be it known that we, WILLIAM A. GUNN and LEWIS W. LINK, citizens of the United States, and residents of the city of Cincinnati, in the county of Hamilton and State of Ohio, have invented certain new and useful Improvements in Trolley-Wheel Holders and Guides, of which the following is a specification.

The several features of our invention and the various advantages resulting from their use, conjointly or otherwise, will be apparent from the following description and claim.

In the accompanying drawing, making a part of this specification, and in which similar letters of reference indicate corresponding parts,—

Figure 1 is a side elevation showing the position of the forks when running. The dotted lines indicate the position of the holder when the forks are thrown up for catching the trolley wire when the trolley is off the wire. Fig. 2 is an end view of Fig. 1, looking at that end of the device which faces toward the left in Fig. 1. In this Fig. 2, the forks are thrown up, and the other parts are in the positions they occupy when the forks are thus elevated.

We shall now proceed to describe our invention in detail.

A indicates a trolley pole.

B, C, C, respectively indicate the respective portions of the trolley pole fork. The arms C, C are attached to the support B beneath them, and are preferably integral therewith. The support B is suitably mounted on the support A. Each arm C is provided with an eye or bearing $C^2$ which latter receives the adjacent end of the axle D, which crosses from one of the said arms to the other and pivotally supports the trolley wheel.

The trolley wheel E is located between the arms C, C, substantially as shown, and it may be rotatable with the axle D or upon it, as the case may be. As in the usual construction, at present employed, the trolley wheel is rotatable upon the axle D, we have so illustrated it in the drawing.

The axle D is held in place by suitable devices; preferably it is held by the split spring pins $D^2$, respectively passing through those portions of the ends of the axle which are outside of the adjacent arm C of the trolley pole fork.

The trolley wheel E is preferably constructed after any of the well known types of said wheels. One common form is illustrated in the drawing, namely: the wheel has a peripheral groove F consisting of a deep groove $F^2$ in which the trolley wire X lies when the said wheel E is running regularly against the said trolley wire X. The remainder of the said groove F consists of two inclined faces $F^3$ and $F^3$, one on each side of the central groove $F^2$. Each of said faces $F^3$ is inclined upward from the adjacent end of the central groove $F^2$ outward to the adjacent outward edge of the wheel rim. The function of this said groove F is well understood. In the event of either face $F^3$ of the groove F meeting the trolley wire X as the trolley wheel rises, this face $F^3$ will deflect the trolley wheel E laterally and guide the said wheel until the wire X is received into the groove $F^2$ of the said wheel.

We will now proceed to describe our invention and the mode of its application.

We provide a frame G. This frame has two side pieces H, H, and means whereby they are connected substantially as hereinafter specified. One of these side pieces H is at one side of the trolley wheel E and between the latter and the adjacent arm C of the trolley fork, and the other of these side pieces H is at the other side of the trolley wheel E and between the latter and the other arm C of the trolley wheel fork. Each side piece H is journaled on the axle D and consequently is rotatable thereon.

Each side piece H is provided with an arm I which begins near the adjacent peripheral edge of the trolley wheel E and inclines outwardly away from that plane of the wheel which is at right angles to the axle D. The face $I^2$ of each of the said arms I, I makes a continuation of the adjacent bevel surface $F^3$ of the trolley wheel, and an object in contact with the outer end of the face $I^2$ of the said arm I can readily pass along the said face $I^2$ onto the said face $F^3$ and thence into the groove $F^2$ of the trolley wheel F.

Each side piece H is provided with an arm J, and the outer end of each of these arms J is connected to a cross bar $J^2$, at a place beyond the periphery of the wheel F. Thus as the frame G is rotated upon the axle D, the said cross bar $J^2$ moves around and beyond the periphery of said wheel F, and therefore does not friction or otherwise impede the rotation of the said wheel. This cross bar $J^2$ carries a stud or arm $J^3$ provided with means for connecting it to the cord R. This cord R is the means whereby the trolley pole A and what it carries is drawn down away from the trolley wire X, and by which the ascent of the elastically upwardly impelled trolley pole and its accompaniments is controlled, and the trolley wheel E is directed toward the trolley wire X. The preferred means for these purposes consist of a hook, or preferably of an eye $J^4$ formed in the arm $J^3$. A link $J^5$ is at one end connected by this eye $J^4$ to the arm $J^3$. To the other end of this link is connected the said cord R. To further strengthen the connection between the said side pieces H, H, and make them as one frame G, we provide each side piece H with an arm K, and connect these arms K, K, outside of the periphery of the trolley wheel E by a cross bar $K^2$.

As before intimated, the entire frame G, as described is rotatable upon the axle D.

To render the frame G light and thus easily carried and manipulated, and also to economize metal in its construction, we make the side pieces H thin, and also the cross bars $J^2$ and $K^2$ thin. We provide each of the arms $K^2$ with a strengthening rib $K^3$, and each of the arms I with a reinforcing rib $I^3$. A thin web $H^2$ extends from the adjacent edge of the arm K to the arm I, on that side of the trolley wheel E. A similar construction is present in the frame G on the other side of the said wheel. A curved rib $H^3$ is present at that edge of the web $H^2$ which is nearer to the axle D, and this rib is immediately attached to the main portion of the frame H.

Inasmuch as the weight of the arms I, I, and of the arms K, K, and of the cross bar $K^2$ overbalances the weight of the arms J, J, and cross bar $J^2$, the device when left free to rotate on the axle D will assume the position shown in Fig. 1. These arms I, I would, if permitted, fall still farther down and the cross bar $J^2$ with stud $J^3$ would be elvated so that the link $J^5$ and the rope R would bear against the trolley wheel E. This last named descent would obviously injure the said link and the said rope, as well as prevent the said wheel E from freely turning. To prevent the said device from so much of a rotation, we place a stop L on each side frame H, so that when the long axis of each arm I is horizontal the said stop L shall impinge against the adjacent edge of the arm C of the said trolley wheel fork. A very convenient manner of forming this stop is to make use of the rib $H^3$ at its forward end to be the stop L, as illustrated in the drawing.

The mode in which our invention operates is as follows: The trolley pole A with the mechanism heretofore described mounted upon it, is duly connected to the car to be electrically driven. The pole A is upwardly elastically pressed by means of a spring or springs, whose location is well known. The rope R is of the usual length to be within the reach of the conductor of the car. When the trolley wheel E is in operative position, it bears up against the trolley wire X, this wire being in the groove $F^2$ of the said wheel E. Whenever it becomes necessary for the conductor to draw down the trolley wheel, either to shift it to another wire, or for any other reason, he moves the said wheel down by drawing down the rope R. As he pulls down this rope R, the latter draws after it the arm J of the frame G. This causes this frame G to rotate and moves the arms I, I, upward until they assume a vertical position. By this time the arms J, J are directly below the lowest point of the periphery of the trolley wheel. The downward movement of the rope R being continued, the whole device is moved down and away from the wire X. When it becomes desirable to locate the said trolley wheel against a trolley wire, then our said invention becomes of especial utility. As the conductor (operator) allows the trolley wheel E and the trolley pole to rise, he directs the said wheel beneath the wire with which he desires the said wheel to make contact. At this juncture the spreading arms I, I are very useful and are of especial advantage. These arms I, I, even though the said wheel is not directly below the said wire, do impinge against the said wire, and direct the said wheel up to the wire, which latter receives the wire in the groove $F^2$ of it, the said wheel. The wide-spread, the extended reach of the said arms I, I, and their inclination adapt them to readily catch the wire, whenever the trolley wheel is in a vertical plane reasonably near the vertical planes of the said wheel, and their respective inclines forming respectively a continuous adjacent inclination of the trolley wheel, the trolley wire has no impediment as it moves to the groove of the rising trolley wheel, but is thereby guided thereto in a certain, sure and easy manner. Such a functional aid greatly assists the operator in causing the said trolley wheel to make contact with the said wire, as he is not confined to a field of operation of about one and one quarter inches which is the width of the trolley wheel, but is given a field or range of some five or more inches within which he can let up the trolley wheel in the vicinity of the wire and yet make it successfully engage the wire, without further efforts to make it so engage. So soon as the said wheel has made due engagement with the said trolley wire, the operator relinquishes his hold on the rope R. Thereupon the arms I, I and that portion of the frame G which is adjacent to these arms, being heavier than the opposite portion of the frame, will immediately fall until that edge of them and of the arms J, J, and that edge of the entire frame G, of which said arms form a part and which is now uppermost, is in a horizontal position. The arms I, I are prevented from falling farther down and unduly elevating the arms J, J, and their rope R by means of the aforesaid stop L. In this position, the frame G and the said arms are out of interference with any mechanism, and therefore out of interference with the said trolley wire. When another application of the said trolley wheel to a trolley wire is necessary, the aforedescribed operations are repeated.

It will be at once apparent that by the use of our invention, much time on the part of the conductor of the car will be saved.

Many slight changes may be made in the general form and arrangement of the parts described without departing from our invention. We therefore consider ourselves at liberty to make such minor changes and alterations as fairly fall within the spirit and scope of our invention.

What we claim as new, and of our invention and desire to secure by Letters Patent, is:—

In combination, a trolley wheel holder, a trolley rope, a trolley wheel, and a frame rotatable relatively to the said holder and consisting of two side rotatable pieces, and provided with outwardly inclined arms for guiding the said wheel to the trolley wire, said frame having an opposite connection uniting the said two side pieces, and provided with an eye for connection with the rope, and said frame having a curved strengthening rib $H^3$ which also constitutes a stop for the said frame, said stop adapted to impinge against the trolley holder as the supplemental abutment or stop and prevent further rotation of the said frame, substantially as and for the purposes specified.

In witness whereof, we have hereunto set our hands, in the presence of two subscribing witnesses.

WILLIAM A. GUNN.
LEWIS W. LINK.

Attest:
K. SMITH,
W. J. JOHNS.